Patented May 25, 1937

2,081,736

UNITED STATES PATENT OFFICE 2,081,736

COLORING MATTERS

Cyril Child and Harry Augustus Thomas, Blackley, Manchester, England, assignors to Imperial Chemical Industries Limited, a corporation of Great Britain No Drawing. Application June 4, 1935, Serial No. 24,983. In Great Britain June 8, 1934

10 Claims. (Cl. 8—6)

This invention relates to the preparation of stable colored colloidal solutions from vat dyestuffs.

By vat dyestuffs we mean that class of dyes which are dyed from alkaline hydrosulfite vats, such as indigoid and anthraquinone vat dyestuffs, dyestuffs of the Hydron Blue class, etc.

When wool or other animal proteid material or wheat starch gluten, or other complex amino acid bodies are immersed in aqueous caustic alkali, imbibition of alkali and water takes place, followed by swelling and eventual solution of the material.

We have found that if a vat dyestuff be vatted in the presence of the said dissolved material and then oxidized, a homogeneous colored liquid is obtained which readily passes through filter paper and which can be diluted with water to any extent.

The dissolving of the proteid material and the vatting may be done simultaneously in the same liquor. Alternatively, animal fiber dyed with the vat dyestuff may be used as starting material instead of a proteid substance and a vat dyestuff separately; in this case it is not necessary to revat the dyestuff. These solutions may be acidified, in which case, if sufficient acid is present, an insoluble gel separates. This can be isolated and mixed with alkali, when a paste is obtained which is redispersible with water to form a colloidal solution, similar in properties to that above described.

The colloidal solutions are of wide application for coloring purposes in trades such as those relating to textiles, paper and rubber.

They may, for example, be used for tinting fabrics, for instance, for improving the whiteness of bleached fabrics; it is then advantageous to add a small amount of a wetting-out agent such as can be obtained according to U. S. P. 1,836,428. They may also be used in dyeing paper pulp in the beater.

The following examples, in which parts are by weight, illustrate but do not limit the invention.

Example 1

200 parts of botany wool slubbing are dissolved in 2000 parts of 5% aqueous sodium hydroxide solution by immersing with occasional stirring for 24 hours at 16–20° C. 1000 parts of 10% aqueous sulfuric acid solution are then stirred into the solution, followed by 220 parts of 10% aqueous sodium hydroxide solution and a solution of 200 parts of glucose in 180 parts of water, giving a total of 3800 parts of solution having a pH value of approximately 10.

30 parts of this solution are added to 1500 parts of an aqueous solution of sodium hydrosulfite and sodium hydroxide solution in which the anthraquinone vat dyestuff, Caledon Blue RC (Colour Index No. 1114), is then dissolved by reduction at 50° C., in the following proportions: 100 parts of a 5% aqueous suspension of the vat dyestuff to 3.75 parts of sodium hydrosulfite in 45 parts of 20% aqueous sodium hydroxide solution.

After standing for some hours, the deep blue solution does not exhibit reducing properties towards easily reducible vat dyestuffs, and is quite stable and filterable through filter paper.

The solution can be diluted freely with cold water to give a clear pale blue solution with which cotton fabric can be evenly tinted by immersion, followed by drying.

Example 2

50 parts of cross-bred wool slubbing are dyed at 50° C. for half an hour with 30% of the anthraquinone vat dyestuff, Caledon Blue GCP (Colour Index No. 1113), from 1500 parts of liquor containing 28 parts of 76° Tw. aqueous sodium hydroxide solution and 12 parts of sodium hydrosulfite and in which the vat color has been previously dissolved by reduction at 50° C.

The shade on the dyed wool is allowed to develop by atmospheric oxidation and the wool is then dissolved in 500 parts of 8% aqueous sodium hydroxide solution by immersing at 16–18° C. for 18 hours and finally stirring at 40–50° C. for 1 hour. 1.5 parts of the wetting agent which can be obtained according to U. S. P. 1,836,428 are then dissolved in the solution. The resulting deep blue solution can be poured into a large bulk of cold water to give a stable clear pale blue solution.

Example 3

50 parts of cross-bred wool slubbing are dyed at 50° C. for half an hour with 30% of the indigoid vat dyestuff, Durindone Red 3B (Colour Index No. 1212), and which has been previously dissolved by vatting at 70–80° C. in 150 parts of a solution of 7.5 parts of sodium hydrosulfite, and 18 parts of a 76° Tw. aqueous solution of sodium hydroxide and 5 parts of Turkey red oil.

After the shade has been allowed to develop, the dyed wool is dissolved as described previously to give a deep red stable solution. This solution can be well mixed with a rubber latex emulsion from which homogeneously colored rubber can be obtained.

*Example 4*

The anthraquinone dyestuff, Caledon Blue GC (Colour Index No. 1115), is dissolved at 50° C. in aqueous alkaline hydrosulfite solution made up from 100 parts of a 5% aqueous suspension of the dyestuff, 3.75 parts of sodium hydrosulfite and 45 parts of a 20% aqueous sodium hydroxide solution in 1500 parts of water, and also containing 50 parts of a 5% solution of wheat flour gluten in aqueous sodium hydroxide of pH 11.

The deep blue solution obtained after atmospheric oxidation is quite stable and is miscible with water in all proportions. Acidification precipitates the deeply blue colored gluten products in a colloidal form, leaving an almost colorless liquor.

*Example 5*

50 parts of wool slubbing dyed as described in Example 2 with 30% of the anthraquinone vat dyestuff, Caledon Gold Orange G (Colour Index No. 1096), are dissolved in 500 parts of 8%, aqueous sodium hydroxide solution. An orange colored solution is obtained which is miscible with water in all proportions giving clear stable solutions.

*Example 6*

50 parts of the indigoid vat dyestuff, Durindone Blue 4BC (Colour Index No. 1184), are mixed with 650 parts of a 5% solution of wool substance in 5% aqueous sodium hydroxide, and vatted at 60° C. with the addition of 15 parts of sodium hydrosulfite and a solution of 18 parts of sodium hydroxide in 350 parts of water. After 1 hour at 60° C. the dark liquor is neutralized with 90 parts of 25% aqueous sulfuric acid while agitating, when the liquor assumes the bright blue shade of the oxidized dyestuff. The liquor is then made acid. If sufficiently acid a colloidal vat dye gel is precipitated and this may be isolated by filtering through cloth. It is washed with water, and if pasted with aqueous sodium hydroxide, disperses readily in water to give a colloidal solution suitable for padding cotton or linen cloth. The paste is also eminently suitable for coloring paper pulp in the beater.

Instead of isolating the collidal vat dye mixture, the slightly acidified liquor containing the bright blue oxidized vat dye and wool substance can be vigorously agitated with 35 parts of aqueous sodium hydroxide of 76° Tw., when a deep blue solution is obtained, which can be diluted with water and passes through Whatman No. 1 filter paper, without loss in tinctorial strength. This solution can be employed for tinting cotton or linen.

We claim:

1. A stable colored colloidal solution of a vat dyestuff comprising a vat dyestuff in an aqueous alkaline solution of wool.

2. A stable colored colloidal solution of a leuco vat dyestuff in an aqueous alkaline solution of wool.

3. In the preparation of stable colored colloidal solutions of vat dyestuffs, the step which comprises incorporating a vat dyestuff in an aqueous alkaline solution containing wool dissolved therein.

4. In the preparation of stable colored colloidal solutions of vat dyestuffs, the step which comprises incorporating a vat dyestuff in leuco form in an aqueous alkaline solution containing wool dissolved therein.

5. In the preparation of stable colored colloidal solutions of vat dyestuffs, the steps which comprise dyeing wool fiber from an alkaline hydrosulfite solution of the dyestuff and dissolving the resulting wool and dyestuff in an alkaline solution, acidifying the solution and isolating the resulting colloidal vat dye gel.

6. In the preparation of stable colored colloidal solutions of vat dyestuffs, the steps which comprise dyeing wool fiber from an alkaline hydrosulfite solutiton of the dyestuff and dissolving the resulting wool and dyestuff in an alkaline solution, acidifying the solution, isolating the resulting colloidal vat dye gel and pasting the said gel in an aqueous alkaline solution.

7. In the preparation of stable colored colloidal solutions of vat dyestuffs, the steps which comprise incorporating a vat dyestuff in leuco form in an aqueous alkaline solution of wool, acidifying the solution, isolating the resulting colloidal vat dye gel and pasting said gel in an aqueous alkaline solution.

8. In the preparation of stable colored colloidal solutions of vat dyestuffs, the steps which comprise adding to an alkaline solution of wool a vat dyestuff, vatting the dyestuff by the addition of sodium hydrosulfite, oxidizing the resulting leuco compound in the solution, acidifying the solution and isolating the resulting colloidal vat dye gel.

9. In the preparation of stable colored colloidal solutions of vat dyestuffs, the steps which comprise dissolving wool in an aqueous solution of an alkali and incorporating therewith an alkaline solution of a vat dyestuff in leuco form.

10. An isolated stable colored colloidal vat dye gel obtainable by the process of claim 5.

CYRIL CHILD.
HARRY AUGUSTUS THOMAS.